US012596376B2

(12) United States Patent
Fröhlich et al.

(10) Patent No.: US 12,596,376 B2
(45) Date of Patent: Apr. 7, 2026

(54) AUTONOMOUS MOBILE ROBOT BEHAVIORAL ANALYSIS FOR DEVIATION WARNINGS

(71) Applicant: Dell Products L.P., Round Rock, TX (US)

(72) Inventors: Herberth Birck Fröhlich, Florianópolis (BR); Ítalo Gomes Santana, Rio de Janeiro (BR); Julia Drummond Noce, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 762 days.

(21) Appl. No.: 18/046,767

(22) Filed: Oct. 14, 2022

(65) Prior Publication Data

US 2024/0126270 A1    Apr. 18, 2024

(51) Int. Cl.
*G05D 1/00*      (2024.01)
*G06N 20/00*     (2019.01)

(52) U.S. Cl.
CPC ........... *G05D 1/0291* (2013.01); *G06N 20/00* (2019.01)

(58) Field of Classification Search
CPC ...... G06N 20/00; G06N 3/008; G05D 1/0291; G05B 23/024

USPC .......................................................... 706/12
See application file for complete search history.

(56) References Cited

U.S. PATENT DOCUMENTS

2019/0138978 A1* 5/2019 Johnson .............. G06Q 10/087

FOREIGN PATENT DOCUMENTS

| CN | 114846509 A | * | 8/2022 | .............. G06T 7/70 |
| CN | 115933625 A | * | 4/2023 | |

* cited by examiner

*Primary Examiner* — April Y Blair
(74) *Attorney, Agent, or Firm* — Workman Nydegger

(57) ABSTRACT

One example method includes receiving real-time operational data related to the operation of Autonomous Mobile Robots (AMRs) belonging to an AMR group. Clusters of expected behavior, for the AMRs, are accessed. The clusters were generated using historical operational data. Each cluster defines a possible behavioral scenario for each AMR and includes a cluster boundary that defines a limit of the expected behavior and a cluster centroid that defines an average of expected behavior of each AMR. Resultant vectors that extend from the cluster centroid to the most recent operational point of each AMR are generated. A predetermined phase threshold value is used to determine when two or more of the resultant vectors are close to each other. The close resultant vectors are grouped to generate Resultant of Resultant Vectors (RoRs). The RoRs are used to identify behavioral scenarios of the AMRs.

14 Claims, 14 Drawing Sheets

800

Receive Real-time Operational Data Of One Or More Autonomous Mobile Robots (AMRs) — 810

Access Clusters of Expected Behavior Including A Cluster Boundary and Centroid — 820

Generate Resultant Vectors — 830

Generate Resultant of Resultant Vectors (RoRs) — 840

Identify Behavioral Scenarios Of The AMRs Using The RoRs — 850

11 / 14

800

810 — Receive Real-time Operational Data Of One Or More Autonomous Mobile Robots (AMRs)

820 — Access Clusters of Expected Behavior Including A Cluster Boundary and Centroid 830 — Generate Resultant Vectors 840 — Generate Resultant of Resultant Vectors (RoRs)

850 — Identify Behavioral Scenarios Of The AMRs Using The RoRs

900

AUTONOMOUS MOBILE ROBOT BEHAVIORAL ANALYSIS FOR DEVIATION WARNINGS

FIELD OF THE INVENTION

Embodiments of the present invention generally relate to Autonomous Mobile Robots (AMR). More particularly, at least some embodiments of the invention relate to systems, hardware, software, computer-readable media, and methods for determining deviations from expected behavior for AMRs in an AMR group.

BACKGROUND

An Autonomous Mobile Robot (AMR) is a type of robot that can understand its location and move through its environment without being overseen directly by an operator or limited to a fixed path. This is partly due to the various sensors that are included in the AMR that allow the AMR to understand its location and environment. Thus, an AMR can avoid many pitfalls such as handling collisions, avoiding obstacles, and reoptimizing paths.

However, to do so, an AMR relies on computer vision algorithms and sensors that have inherent uncertainties, which may impact its overall performance in executing any assigned task or even be unable to accomplish it. Moreover, another source of uncertainty and failure is related to the assignment process for a fleet of AMRs. It mostly occurs in settings where a fleet of AMRs is assigned to execute a set of tasks concomitantly, which include that some tasks can only be started according to the completion of other tasks. These integrated tasks, however, are challenging to be addressed and become even harder when the behaviors of these autonomous entities deviate from expected behaviors.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
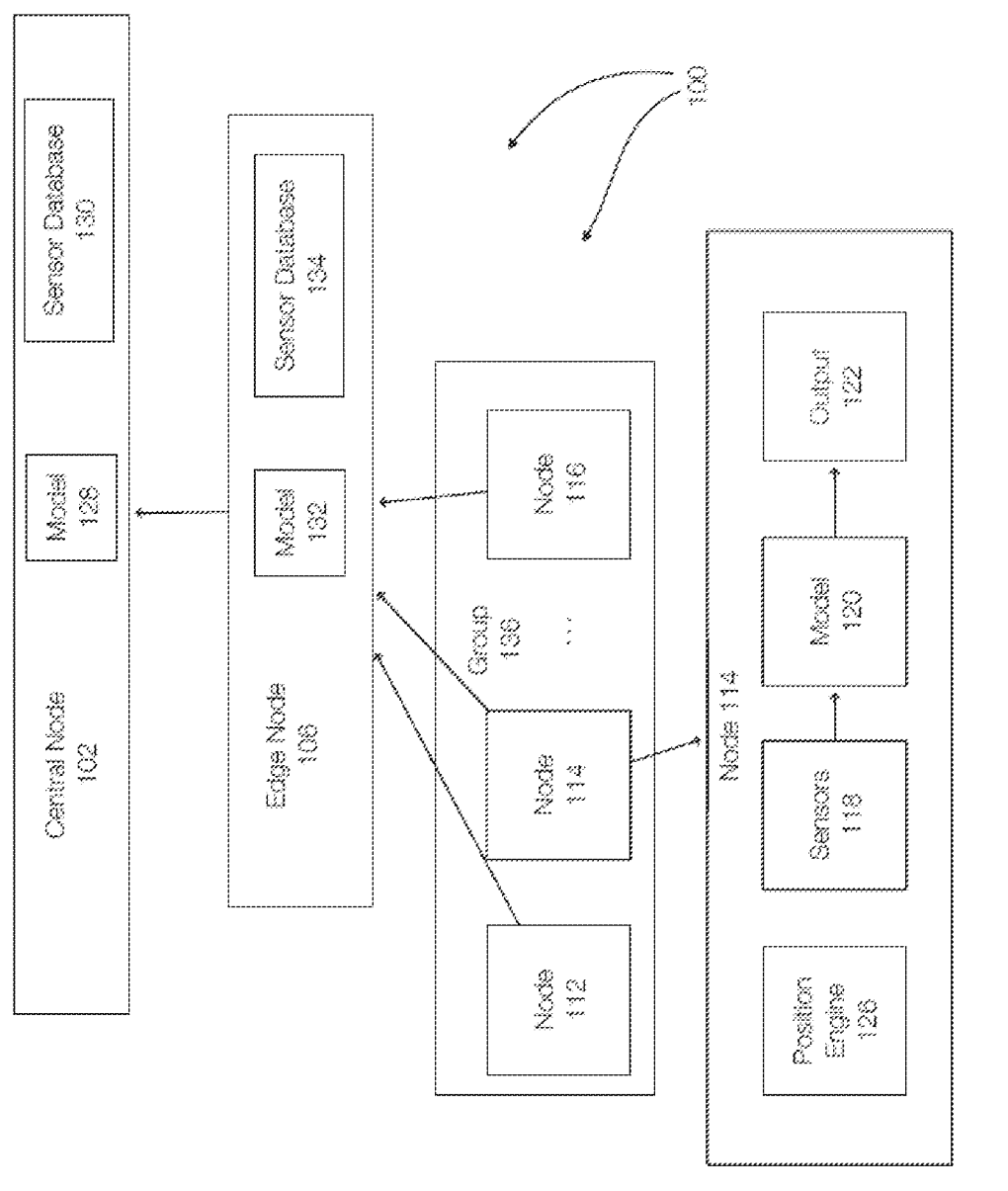
FIG. 1 illustrates an environment in which embodiments of the invention may be deployed or implemented.

Embodiments of the present invention generally relate to Autonomous Mobile Robots (AMR). More particularly, at least some embodiments of the invention relate to systems, hardware, software, computer-readable media, and methods for determining deviations from expected behavior for AMRs in an AMR group.

In general, example embodiments of the invention are directed towards determining deviations from expected behavior by AMRs in an AMR group. One example method includes receiving real-time operational data related to the the operation of Autonomous Mobile Robots (AMRs) belonging to an AMR group. Clusters of expected behavior, for the AMRs, are accessed. The clusters were generated using historical operational data. Each cluster defines a possible behavioral scenario for each AMR and includes a cluster boundary that defines a limit of the expected behavior and a cluster centroid that defines an average of expected behavior of each AMR. Resultant vectors that extend from the cluster centroid to the most recent operational point of each AMR are generated. A predetermined phase threshold value is used to determine when two or more of the resultant vectors are close to each other. The close resultant vectors are grouped to generate Resultant of Resultant Vectors (RoRs). The RoRs are used to identify behavioral scenarios of the AMRs.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Aspects of an Example Architecture and Environment

An Autonomous Mobile Robot (AMR) is a type of robot that can understand its location and move through its environment without being overseen directly by an operator or limited to a fixed path. This is partly due to the various sensors that are included in the AMR that allow the AMR to understand its location and environment. Thus, an AMR can avoid many pitfalls such as handling collisions, avoiding obstacles, and reoptimizing paths.

However, to do so, an AMR relies on computer vision algorithms and sensors that have inherent uncertainties, which may impact its overall performance in executing any assigned task or even be unable to accomplish it. Moreover, another source of uncertainty and failure is related to the assignment process for a fleet of AMRs. It mostly occurs in settings where a fleet of AMRs is assigned to execute a set of tasks concomitantly, which include that some tasks can only be started according to the completion of other tasks. These integrated tasks, however, are challenging to be addressed and become even harder when the behaviors of these autonomous entities deviate from expected behaviors. As an example, AMRs involved in integrating logistics, scheduling, manufacturing, and storage of items may become unreliable due to the number of stacked uncertainties and failures in each step.

It is common in many scenarios to have a group of AMRs performing simultaneously the same task or even different tasks in the same environment. As mentioned previously, AMRs are prone to uncertainties and, because of that, a given AMR can deviate from its expected behavior in many ways, either with respect to its own historical behavior or to the behavior of all AMRs that belong to the same group as the given AMR.

Many technical benefits can arise from the rapid detection of these unexpected deviations from an AMR's expected behavior. For example, once a deviation from the expected behavior is detected, a user or the user's computing system can promptly deactivate the deviated AMR before the AMR engages in any undesired incident, especially those related to dangerous outcomes or financial losses. In addition, the detection of deviations from the expected behavior allow the user or the user's computing system to save time and computing resources that would otherwise be spent trying to determine the deviation.

FIG. 1 discloses aspects of an environment in which embodiments of the invention may be deployed or implemented. FIG. 1 illustrates a system (e.g., a logistics system) 100 that includes a central node 102(A) and an edge node 106(N). The edge node 106, for example, may be associated with a specific environment and may operate with respect to a group 136 of nodes such as the nodes 112, 114, and 116.

More specifically, the edge node 106 may be associated with a set or group 136 of nodes represented by the nodes 112, 114, and 116. In this example, forklifts or automated mobile robots (or the resources thereon) may be examples of the nodes 112, 114, and 116.

The node 114 further may include sensors 118 and a model 120, which generates an inference or an output 122. The model 120 may be representative of multiple machine-learning (ML) models. Each model may be able to detect a certain type of event using the same or similar input data from the sensors 118. The data generated by the sensors 118 may be stored as a sensor dataset.

In some examples, the data generated by the sensors 118 is provided to the central node 102, which may also have a copy of the model 120, represented as model 128. The edge node 106 may include a model 132 and sensor database 134. The edge node 106 may act as the central node 102 in some examples. The sensor database 130 may store sensor data received from all of the nodes 112, 114, 116. Thus, the node 114 may store sensor data generated by the node 114. The edge node 106 may store sensor data generated by the nodes 112, 114, and 116 in the database 134. The sensor database 134 includes sensor data from all nodes associated with all of the edge nodes 104, 106, 108, and 110. The sensor database 130 may store the sensor data from the edge node 106 and/or other edge nodes when present, which may correspond to other environments, and which may be similarly configured. At the node 114, only the recently generated data is generally stored. Local data may be deleted after transmission to the central node 102 and/or to the edge node 106. Inferences for a time t are generated using the most recent sensor data.

The central node 102 (e.g., implemented in a near edge infrastructure or in the cloud) may be configured to communicate with the node 114. The communication may occur via the edge node 106. The communication may be performed using radio devices through hardware such as a router or gateway or other devices (e.g., the edge node 106). The node 114 may also receive information from the central node 102 and use the information to perform various operations including logistics operations.

The sensors 118 may include position sensors and inertial sensors that generate positional data that determine a position or trajectory of an object in the environment. Positional data can be collected as time series data, which can be analyzed to determine a position of the forklift, a velocity of the forklift, a trajectory or direction or travel, a cornering, or the like. The inertial sensors allow acceleration and deceleration to be detected in multiple directions and axes.

In one example, a map of the environment is generated and may be stored at the central node 102 and/or at the edge nodes 104, 106, 108, and 110. The system may be configured to map the position data received from the nodes into a map of the environment. The node 114 can determine its own position within the environment. The positions of all nodes (objects) can be determined with respect to each other and with respect to the environment.

The central node 102 may include a model 128 and a sensor database 130. The sensor database 130 may include a database for different sensor types. Thus, the sensor database 130 may include a position data database, an inertial database, and the like. In another example, the sensor database 130 may store all sensor data together and/or in a correlated form such that position data can be correlated to inertial data at least with respect to individual nodes and/or in time.

In one example, the local model 120 is trained at the central node 102 and deployed to the relevant nodes 112, 114, and 116. The local model 120 is trained using available (historical) positioning and/or inertial measurement data (and/or other sensor data, which may include video data). After training, the local model 120 may be deployed to the nodes. In one example, the models 120 and 128 are the same. One difference is that the local model 120 may operate using locally generated data at the node 114 as input while the model 128 may use data generated from multiple nodes in the multiple environments as input (e.g., the sensor data in the sensor database 130).

Figure 2:
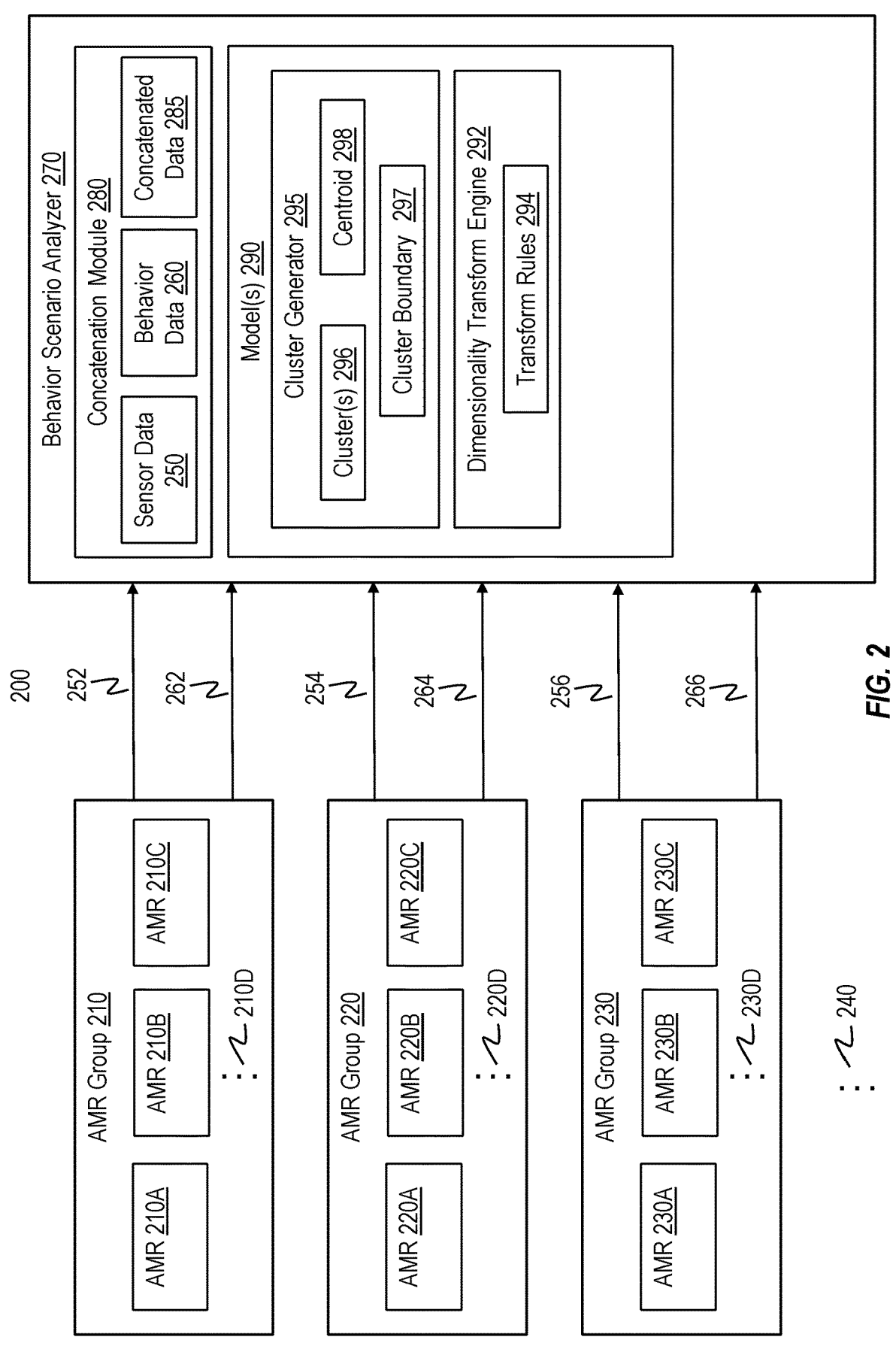
FIG. 2 illustrates an embodiment of an environment for a system to determine deviations from expected behavior for a group of Autonomous Mobile Robots (AMRs)

FIG. 2 discloses an embodiment of an environment for a system 200 to determine deviations from expected behavior for a group of AMRs. The system 200 may be implemented in or as part of the system 100 of FIG. 1. The embodiment of FIG. 2 can be considered an offline or training stage as historical data is used by a behavior scenario analyzer in determining scenarios of deviations from expected behavior for a group of AMRs as will be described in more detail to follow.

As shown in FIG. 2, the system 200 includes a first AMR group 210 that includes an AMR 210A, an AMR 210B, an AMR 210C, and any number of additional AMRs as illustrated by the ellipses 210D. A second AMR group 220 includes an AMR 220A, an AMR 220B, an AMR 220C, and any number of additional AMRs as illustrated by the ellipses 220D. A third AMR group 230 includes an AMR 230A, an AMR 230B, an AMR 230C, and any number of additional AMRs as illustrated by the ellipses 230D. The ellipses 240 represent that there can be any number of additional AMR groups. As previously described, an AMR group may be many AMRs that perform the same task simultaneously or that perform different tasks in the same environment such as a warehouse.

Each of the AMRs in the AMR groups include sensors, which may correspond to the sensors 118 previously described. Accordingly, each of the AMRs in the AMR groups 210, 220, 230, and potentially 240 generate sensor data. For example, sensor data 252 represents the sensor data from each AMR of the AMR group 210, sensor data 254 represents the sensor data from each AMR of the AMR group 220, and sensor data 256 represents the sensor data from each AMR of the AMR group 230. Although not illustrated, sensor data from each AMR of the potential AMR group or groups 240 is also generated. For ease of explanation, the sensor data 252, 254, and 256 is also referred to herein as sensor data 250. The sensor data 250 may be generated at a time in the past and stored in a database such as the database 130 or 134 previously described and thus may be referred to as "historical sensor data". The sensor data 250 is an example of historical operational data of the AMR groups 210-240.

The AMR groups 210, 220, 230, and potentially 240 are also associated with behavior data. For example, the behavior data 262 represents behavior data associated with each AMR of the AMR group 210, the behavior data 264 represents behavior data associated with each AMR of the AMR group 220, and the behavior data 266 represents behavior data associated with each AMR of the AMR group 230. Although not illustrated, behavior data is associated with each AMR of the potential AMR group or groups 240. For ease of explanation, the behavior data 262, 264, and 266 is also referred to herein as behavior data 260. The behavior data 260 is an example of historical operational data of the AMR groups 210-240.

The behavior data 260 is data reflecting the behavior of each AMR in the AMR groups 210, 220, 230, and 240. That is, the behavior data 260 is data that provides information about the behavior of an AMR as it performs various tasks and otherwise interacts with its environment in its normal operation. For example, the behavior data 260 can include, but is not limited to, the number and types of tasks performed in a given time period, number of stops taken during a task, charging periods, the amount of time it takes to perform a task, the number of times an object is lifted, and the weight of the lifted object. It will be noted that there can be any number and type of the behavior data and thus the embodiments and claims disclosed herein are not limited to any particular number or type of behavior data.

In some embodiments, the behavior data 260 is recorded by or observed by the AMRs themselves. In other embodiments, a Subject Matter Expert (SME) may be the entity that defines and/or provides the behavior information for use in determining behavioral scenarios as will be explained in more detail to follow. In the environment of FIG. 2, the behavior data 260 may be considered historical data that is collected or provided in the past and stored in a database.

The system 200 further includes a behavior scenario analyzer 270, which may be implemented at a central node, such as the central node 102, although it may also be implemented at an edge node or any other node of the system. In operation, the behavior scenario analyzer is configured to analyze the sensor data and the behavior data of the different AMR groups and generate one or more clusters of normative behavior for the different AMR groups, where each cluster refers to a possible operational behavioral scenario for the AMR groups.

Accordingly, the behavior scenario analyzer 270 includes a concatenation module 280. In operation, the concatenation module 280 is configured to concatenate or aggregate the sensor data and the behavior data that is received by the behavior scenario analyzer 270. For example, the concatenation module 280 may concatenate the received sensor data 250 and behavior data 260 to generate concatenated data 285.

The behavior scenario analyzer 270 also includes a model 290, which may represent one or more machine-learning (ML) models and may correspond to one or more of the ML models 120, 128, of 132 previously discussed. The model 290 includes a cluster engine 295 that in operation is configured to generate the one or more clusters 296 of normative behavior for each AMR group. From the generated clusters, a cluster boundary 297 and a centroid 298 for each cluster can be determined, where the cluster boundary 297 delimits the normative behavior of an AMR in relation to the cluster 296's centroid 298. It will be noted that the embodiments and claims disclosed herein are not limited to any particular type of implementation of the cluster engine 295. The operation of the cluster engine 295 generating the clusters will be described in more detail to follow.

The model 290 also includes a dimensionality transform engine 292 that in operation is configured to produce transform rules for reducing the dimensionality space 294 of the concatenated data 285 prior to the clustering by the cluster generator 295. For example, the dimensionality may be reduced to two dimensions to enable rules of a resultant creation that leverages magnitude and phase, or angle as will be described. In one embodiment, the dimensionality transform engine 292 may be implemented as Principled Component Analysis (PCA). In another embodiment, the dimensionality transform engine 292 may be implemented as Factor Analysis of Mixed Data (FAMD) for both continuous and categorical features. In still other embodiments, the dimensionality transform engine 292 may be implemented as a handcrafted transform that generates one variable for the sensor data and another variable for the behavior data, and then uses the variable to generate a two-dimension feature space. It will be noted that the embodiments and claims disclosed herein are not limited to any particular type of implementation of the dimensionality transform engine 292. The operation of the dimensionality transform engine 292 reducing the dimensionality will be described in more detail to follow.

Figure 3A:
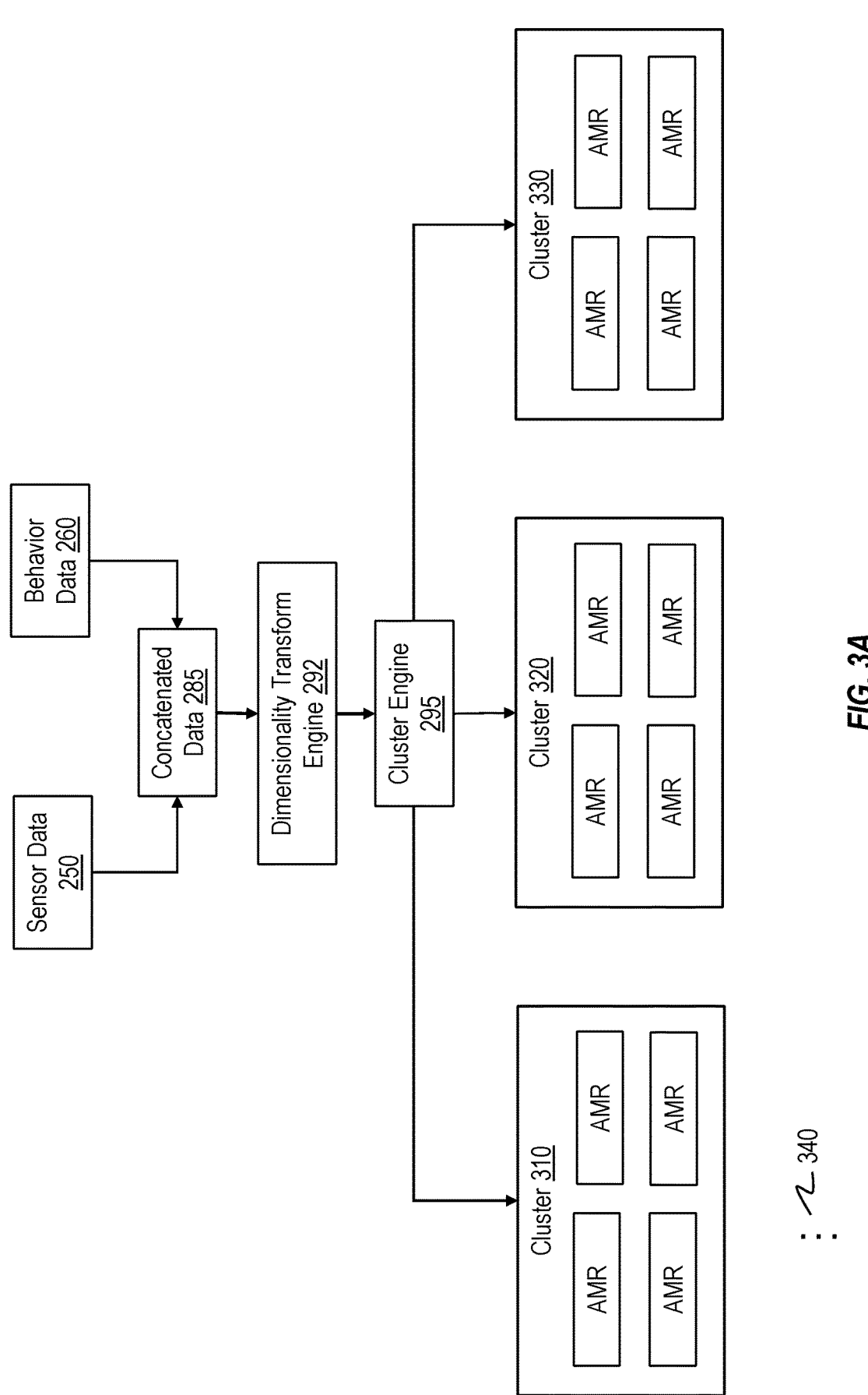
FIGS. 3A and 3B illustrate the operation of a behavior scenario analyzer during an offline stage.
Figure 3B:
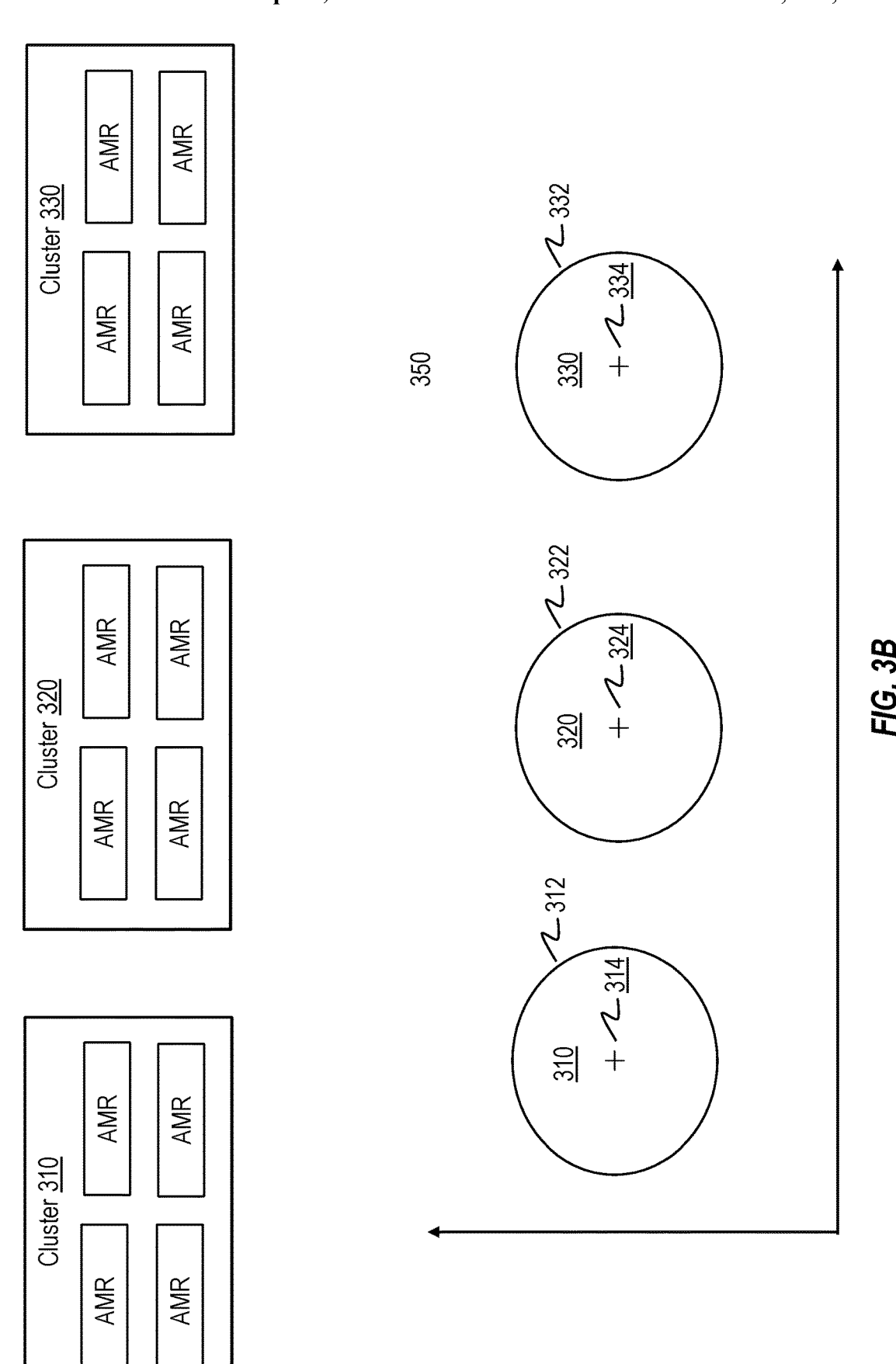

FIGS. 3A and 3B illustrate the operation of the behavior scenario analyzer 270 during the offline stage. As shown, the behavior scenario analyzer 270 receives the historical sensor data 250 and the behavior data 260. This data is then concatenated into the concatenated data 285 by the concatenation module 280 and provided to the model 290. The model 290, in particular the dimensionality transform engine 292, then transforms the concatenated data 285 into a reduced dimensionality space as shown at 350 using the transform rules for reducing the dimensionality space 294.

The model 290, in particular the cluster engine 295, then generates a first cluster 310, a second cluster 320, a third cluster 330 and as many additional clusters as needed as illustrated by the ellipses 340, which are examples of the one or more clusters 296. From each of these clusters, a cluster boundary 297 and a centroid 298 can be determined. For example, a cluster boundary 312 and a centroid 314 can be determined for the cluster 310, a cluster boundary 322 and a centroid 324 can be determined for the cluster 320, and a cluster boundary 332 and a centroid 334 can be determined for the cluster 330, where the cluster boundaries 312, 322, and 332 correspond to the cluster boundary 297 and the centroids 314, 324, and 334 correspond to the centroid 298. As mentioned previously, the clusters 310-330 represent normative behavior for the different AMR groups 210-240, where each cluster refers to a possible operational behavioral scenario for the AMR groups and boundaries of the clusters define the boundaries of the normal behavior.

It will be noted that although FIGS. 3A and 3B show that that the clustering occurs after the dimensionality transformation, this need not be case as it is possible for the dimensionality transform engine 292 to transform the clusters instead, is such appropriate techniques are available. Alternative embodiments may also exist in which no dimensionality reduction is required or performed, and the clustering is performed over the concatenated data directly.

Figure 4:
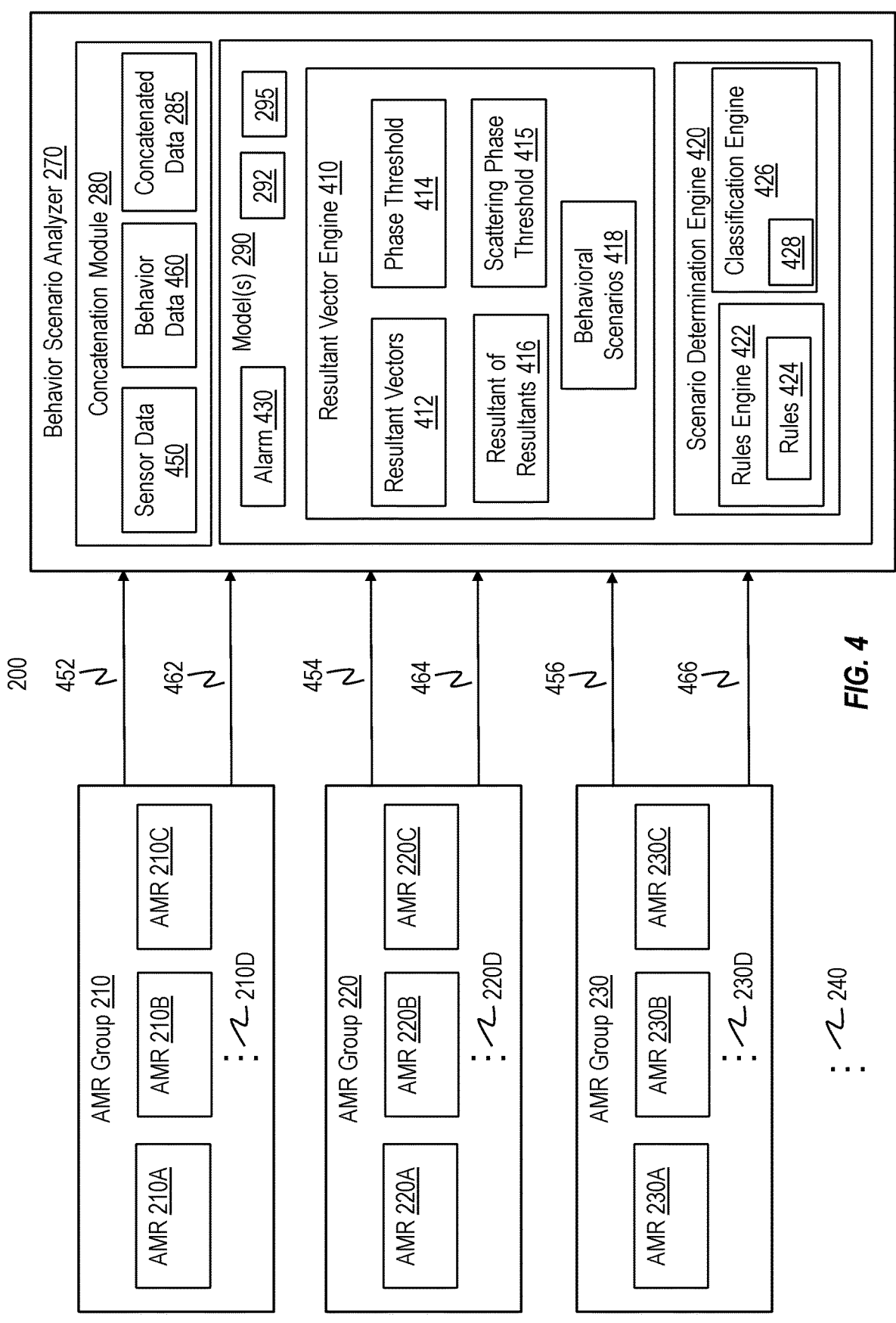
FIG. 4 illustrates an alternative embodiment of an environment for a system to determine deviations from expected behavior for a group of AMRs.

FIG. 4 illustrates an alternative embodiment of the system 200 of FIG. 2. Accordingly, for ease of explanation not all of the elements shown in FIG. 2 are shown in FIG. 4 The embodiment of FIG. 4 may be considered an online or operational stage as real-time operational data is used by the behavior scenario analyzer. During the online stage, the cluster boundary 297 and the centroid 298 for each of the one or more clusters 296 determined during the offline stage and the transform rules for reducing the dimensionality space 294 used during the offline stage are loaded by the system 200 so that the cluster boundary, centroid, and transformation rules can be used during the online stage in determining behavioral deviations for a group of AMRs as will be explained in more detail.

As shown in FIG. 4, the model 290 of the behavior scenario analyzer 270 includes a resultant vector engine 410 that in operation is configured to determine one or more resultant vectors 412 for each operational point received from the AMRs in the AMR groups 210-240. The one or more resultant vectors 412 are then used by the resultant vector engine 410 in conjunction with a predetermined phase threshold 414 to determine one or more Resultant of Resultant Vectors (RoR) 416 to identify one or more behavioral scenarios 418. In some embodiments, a scattering phase threshold 415 is also used by the resultant vector engine 410 to identify one or more behavioral scenarios 418.

The model 290 of the behavior scenario analyzer 270 also includes a scenario determination engine 420 that in operation is configured to determine which of the one or more the behavioral scenarios 418 are occurring. The determination of which of the behavioral scenarios 418 is occurring may obtained using a domain-dependent rules engine 422 and/or a decision classification engine 426.

In FIG. 4, each of the AMRs in the AMR groups 210, 220, 230, and potentially 240 generate sensor data as previously described. For example, in FIG. 4 sensor data 452 represents the sensor data from each AMR of the AMR group 210, sensor data 454 represents the sensor data from each AMR of the AMR group 220, and sensor data 456 represents the sensor data from each AMR of the AMR group 230. Although not illustrated, sensor data from each AMR of the potential AMR group or groups 240 is also generated. For ease of explanation, the sensor data 452, 454, and 456 is also referred to herein as sensor data 450. The sensor data 450 is generated in real-time and thus differs from the historical sensor data 250 that was generated in the past and stored in a database. The sensor data 450 is an example of real-time operational data of the AMR groups 210-240.

In the embodiment of FIG. 4, the AMR groups 210, 220, 230, and potentially 240 are also associated with behavior data 460. For example, the behavior data 262 represents behavior data associated with each AMR of the AMR group 210, the behavior data 264 represents behavior data associated with each AMR of the AMR group 220, and the behavior data 266 represents behavior data associated with each AMR of the AMR group 230. Although not illustrated, behavior data is associated with each AMR of the potential AMR group or groups 240. For ease of explanation, the behavior data 462, 464, and 466 is also referred to herein as behavior data 460. The behavior data 460 is an example of real-time operational data of the AMR groups 210-240. The behavior data 460 corresponds to the behavior data 260 previously described. In other words, the types of behavior data used in the generation of the clusters 310, 320, and 330 during the offline stage will also be used during the process of the online stage.

The operation of the behavior scenario analyzer 270 including the resultant vector engine 410 and the scenario determination engine 420 will now be explained. Every time the behavior scenario analyzer 270 receives the real-time sensor data 450 and the behavior data 460 from an AMR of the AMR groups 210-240, the data is concatenated into the concatenated data 285 and the model 290 determines a new operational point that is mapped into a reduced dimensionality using the transform rules for reducing the dimensionality space 294 that were used in the offline stage.

Figure 5:
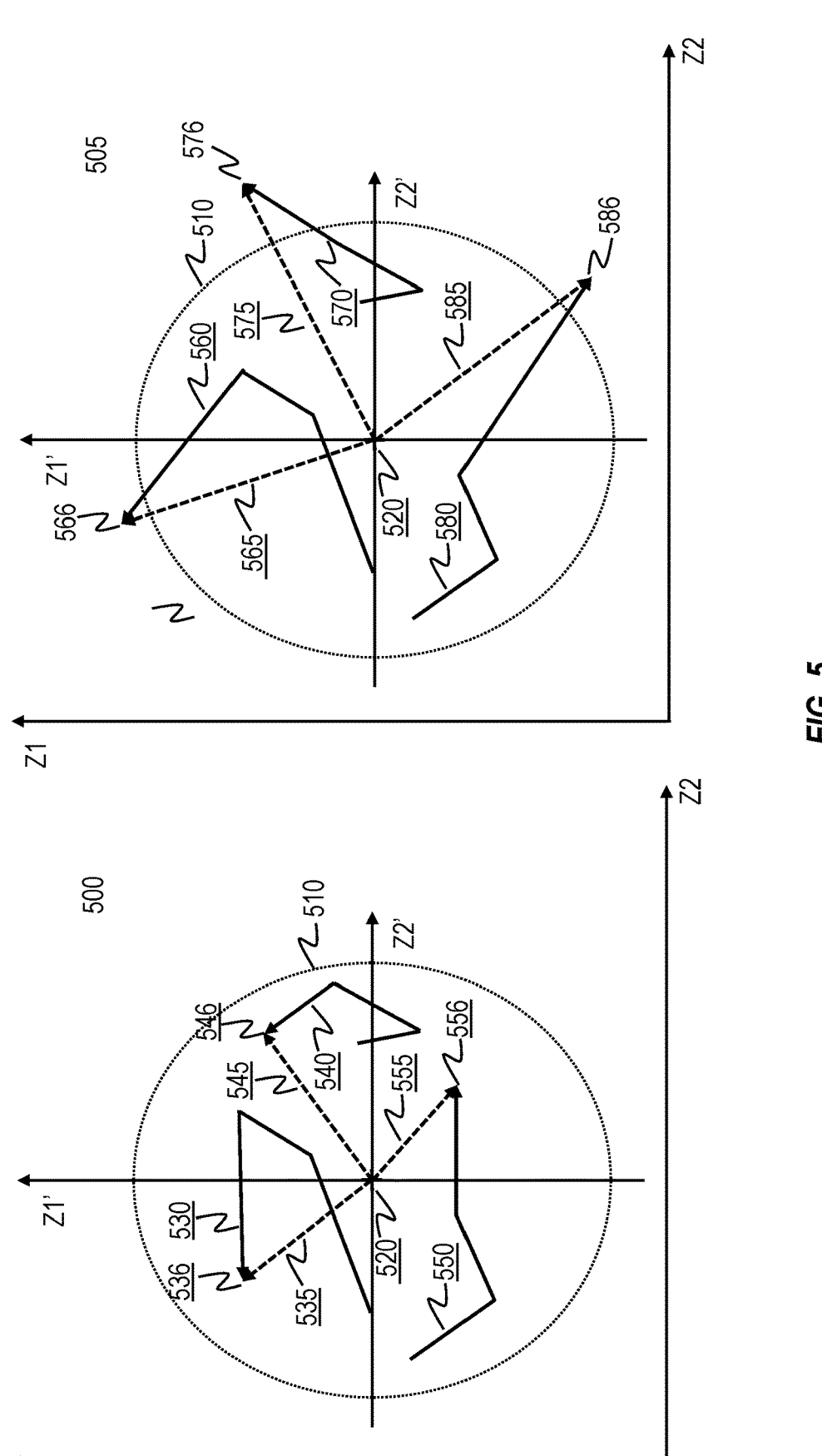
FIG. 5 illustrates an embodiment of mapping operational points into a 2D feature space that includes a cluster boundary and a centroid.

As shown in FIG. 5, in one embodiment the operational points are mapped into a 2D feature space that includes a cluster boundary 510 and a centroid 520, where the cluster boundary 510 and the centroid 520 correspond to the cluster boundary 297 and centroid 298 that were determined during the offline stage. FIG. 5 also shows an X-axis Z1, a Y-axis Z2, and cluster reference coordinates Z1' and Z2' for the 2D feature space.

The left side of FIG. 5 denoted as 500 shows the progression of three AMRs of an AMR group as their respective operational points are updated in real-time as the sensor data 450 and the behavior data 460 are received. For example, the progression of an AMR 530, 540, and 550 is shown. In addition, the resultant vector engine 410 generates a resultant vector for each of the AMRs. For example, the resultant engine 410 generates a resultant vector 535 for the AMR 530, a resultant vector 545 for the AMR 540, and a resultant vector 555 for the AMR 550, where the resultant vectors 535, 545, and 555 correspond to the resultant vector 412. The resultant vectors show the AMR progression in relation to the centroid 520 and are used to identify if there is any deviation in expected behavior. In other words, the resultant vectors show a connection between the centroid and the most recent operational point fora given AMR of the AMR group. Thus, the resultant vector 535 extends from the centroid 520 to the most recent operational point 536, the resultant vector 545 extends from the centroid 520 to the most recent operational point 546, and the resultant vector 555 extends from the centroid 520 to the most recent operational point 556. Accordingly, 500 shows that the AMRs are following the expected behavior of their operational scenarios since all of the resultant vectors 535, 545, and 555 are inside of the cluster boundary 510, as the cluster boundary defines the limit of normal or expected behavior.

The right side of FIG. 5 denoted as 505 shows the progression of three AMRs of an AMR group as their respective operational points are updated in real-time as the sensor data 450 and the behavior data 460 are received. For example, the progression of an AMR 560, 570, and 580 is shown. In addition, the resultant vector engine 410 generates a resultant vector for each of the AMRs. For example, the resultant vector engine 410 generates a resultant vector 565 for the AMR 560, a resultant vector 575 for the AMR 570, and a resultant vector 585 for the AMR 580, where the resultant vectors 565, 575, and 585 correspond to the resultant vector 412. Thus, the resultant vector 565 extends from the centroid 520 to the most recent operational point 566, the resultant vector 575 extends from the centroid 520 to the most recent operational point 576, and the resultant vector 585 extends from the centroid 520 to the most recent operational point 586. Accordingly, 505 shows that the AMRs are deviating from the expected behavior of their operational scenario since all of the resultant vectors 565, 575, and 585 are outside of the cluster boundary 510.

As mentioned above, the resultant vector is generated for each newly obtained operational point. From each resultant vector, the magnitude of the resultant vector and the phase of an angle between the resultant vectors can be obtained. In the embodiment, the resultant vector engine 410 is able to use the magnitudes of the resultant vectors and the phases to determine a Resultant Vector of Resultant Vectors (RoR) such as the RoR 416 that can then be used to identify one or more behavioral scenarios.

Figure 6:
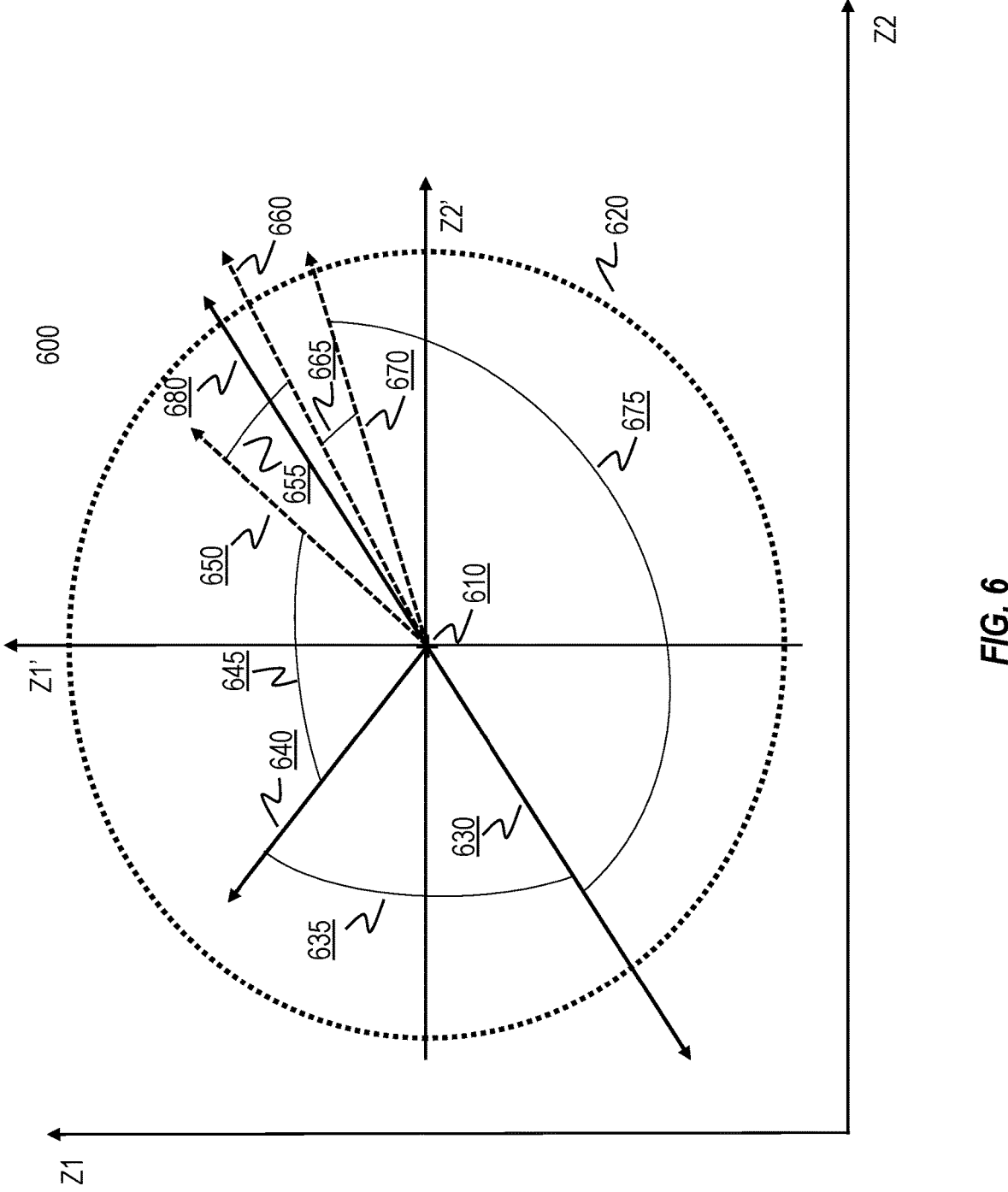
FIG. 6 illustrates a visual representation of generating a Resultant of Resultant Vectors (RoRs) for each AMR.

FIG. 6 illustrates a visual representation 600 of generating RoRs for each AMR. As illustrated, FIG. 6 shows a cluster boundary 610 and a centroid 620, where the cluster boundary 610 and the centroid 620 correspond to the cluster boundary 297 and centroid 298 that were determined during the offline stage. FIG. 6 also shows an X-axis Z1, a Y-axis Z2, and cluster reference coordinates Z1' and Z2' for the 2D feature space.

FIG. 6 also illustrates a resultant vector 630, a resultant vector 640, a resultant vector 650, a resultant vector 660, and a resultant vector 670. In addition, the figure illustrates the angles between the resultant vectors. For example, an angle 635 is between the resultant vectors 630 and 640, an angle 645 is between the resultant vectors 640 and 650, an angle 655 is between the resultant vectors 650 and 660, an angle 665 is between the resultant vectors 660 and 670, and an angle 675 is between the resultant vectors 630 and 670.

In operation, the resultant vector engine 410 groups all resultant vectors that close to each other into a single RoR, where how close they are is defined by the phase threshold 414. Thus, if an angle between two resultant vectors is less than the phase threshold 414, then the two resultant vectors are grouped into the same RoR. However, if the angle between two resultant vectors is not less than the phase threshold 414, they are not grouped into the same RoR, but may be grouped into separate RoRs with other close resultant vectors. Finally, If a resultant vector is not sufficiently close to any other resultant vector, this resultant vector becomes an RoR by itself. The magnitude of the resulting RoR is the average of magnitudes of all the resultant vectors that belong to it. Likewise, the phase of the resulting RoR is average of phases of all the resultant vectors that belong to it.

In FIG. 6, the angle 635 between the resultant vector 630 and the resultant vector 640 and the angle 675 between the resultant vector 630 and the resultant vector 670 are both above the phase threshold 414. Accordingly, there is no resultant vector close enough to group with the resultant vector 630 and so the resultant vector 630 becomes an RoR by itself. Likewise, the angle 645 between the resultant vector 630 and the resultant vector 640 and the angle 645 between the resultant vector 640 and the resultant vector 650 are both above the phase threshold 414. Accordingly, there is no resultant vector close enough to group with the resultant vector 640 and so the resultant vector 640 becomes an RoR by itself.

The angle 655 between the resultant vectors 650 and 660 is below the phase threshold 414 and so these two resultant vectors can be grouped into a single resultant vector having an average magnitude and phase. It is then determined if the angle 675 between the single resultant vector generated by grouping resultant vectors 650 and 660 and the resultant vector 670 is below the phase threshold 414. In FIG. 6, this is the case and so the resultant vector 670 is grouped with the single resultant vector generated by grouping resultant vectors 650 and 660 to generate a RoR 680 having an average magnitude and phase. It will be noted that the resultant vectors 650, 660, and 670 are shown as dashed lines to indicate that they are grouped together to form the RoR 680. Thus, the process of combining the resultant vectors may be a pairwise method where two resultant vectors are checked to see if the angle between them is below the phase threshold 414 and then if they are combined into a single resultant vector, the next neighboring resultant vector is checked and combined if the angle is below the phase threshold 414. This process is repeated until there are no neighboring resultant vectors with an angle below the phase threshold 414.

Accordingly, the generation and use of the RoRs allows for the identification of different behavioral scenarios 418. That is, the RoRs reveal details about the behavior of the AMRs of the AMR groups that can then be used to determine behavioral deviations from the expected normal behavior.

FIGS. 7A-7E graphically illustrate different behavioral scenarios 418 that can be identified based on the use of the RoRs. It will be noted that the illustrated behavioral scenarios are not the only scenarios that can be identified using RoRs and thus are not limiting to the embodiments and claims disclosed herein. As illustrated, FIGS. 7A-7E show a cluster boundary 710 and a centroid 720, where the cluster boundary 710 and the centroid 720 correspond to the cluster boundary 297 and centroid 298 that were determined during the offline stage. FIGS. 7A-7E also illustrate an X-axis Z1, a Y-axis Z2, and cluster reference coordinates Z1' and Z2' for the 2D feature space.

Figure 7A:
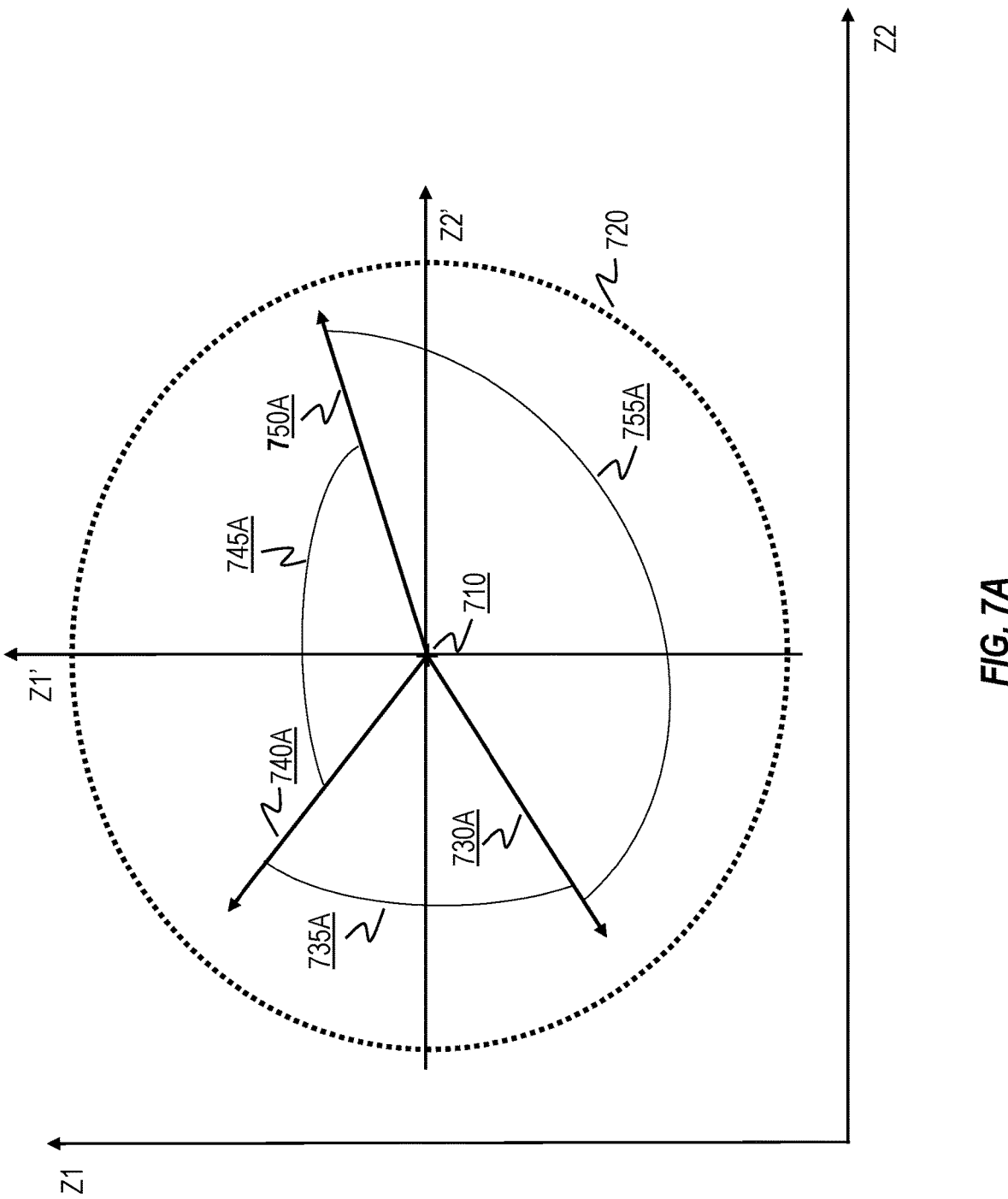
FIGS. 7A-7E illustrate different behavioral scenarios that can be identified based on the use of RoRs.

FIG. 7A further illustrates an RoR 730A, an RoR 740A, and an RoR 750A and angles 735A, 745A, and 755A between the RoRs. As shown, in this scenario there are no RoRs outside of the cluster boundary 710.

Figure 7B:
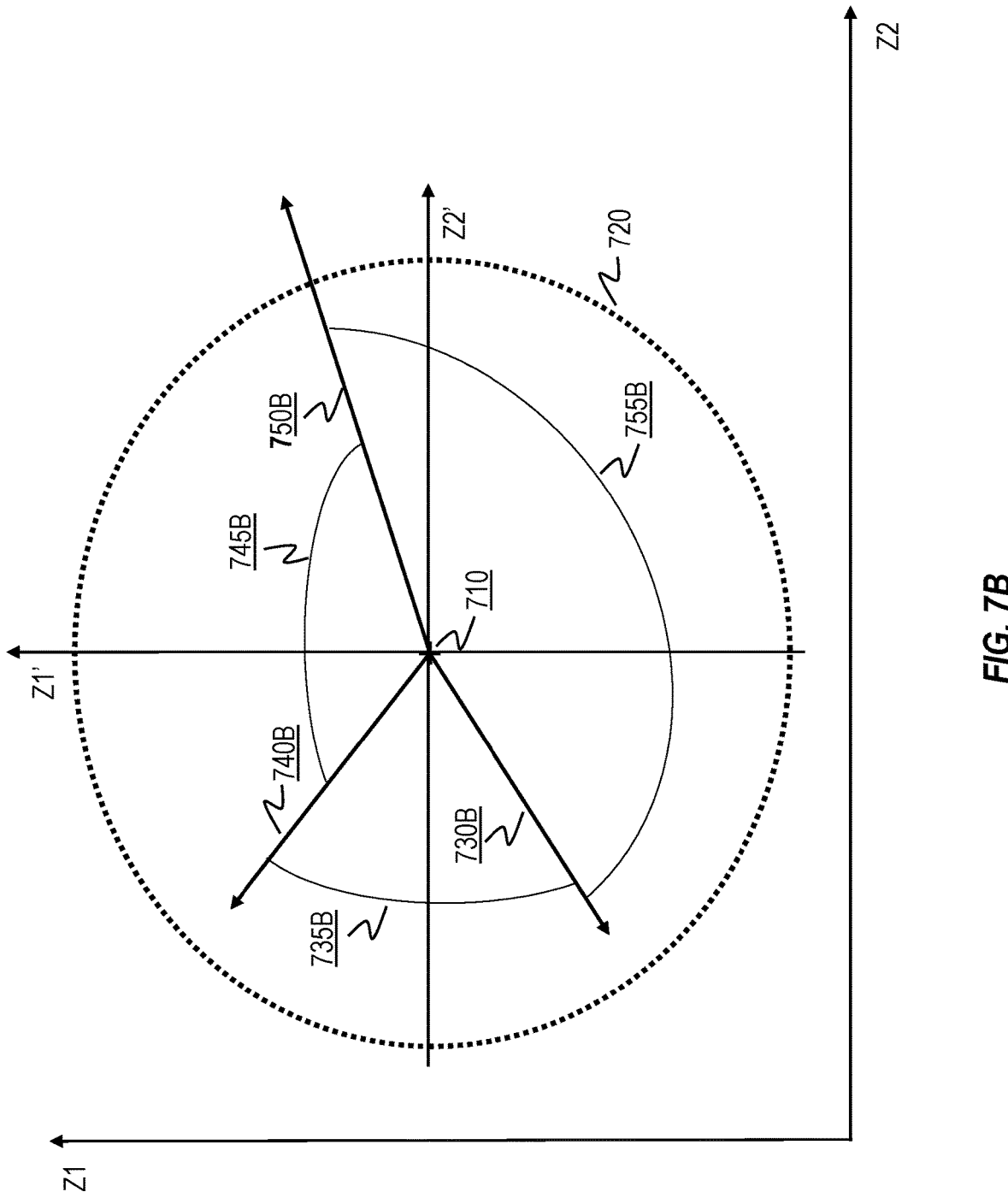

FIG. 7B further illustrates an RoR 730B, an RoR 740B, and an RoR 750B and angles 735B, 745B, and 755B between the RoRs. As shown, in this scenario, the RoR 750B is outside the cluster boundary 710.

Figure 7C:
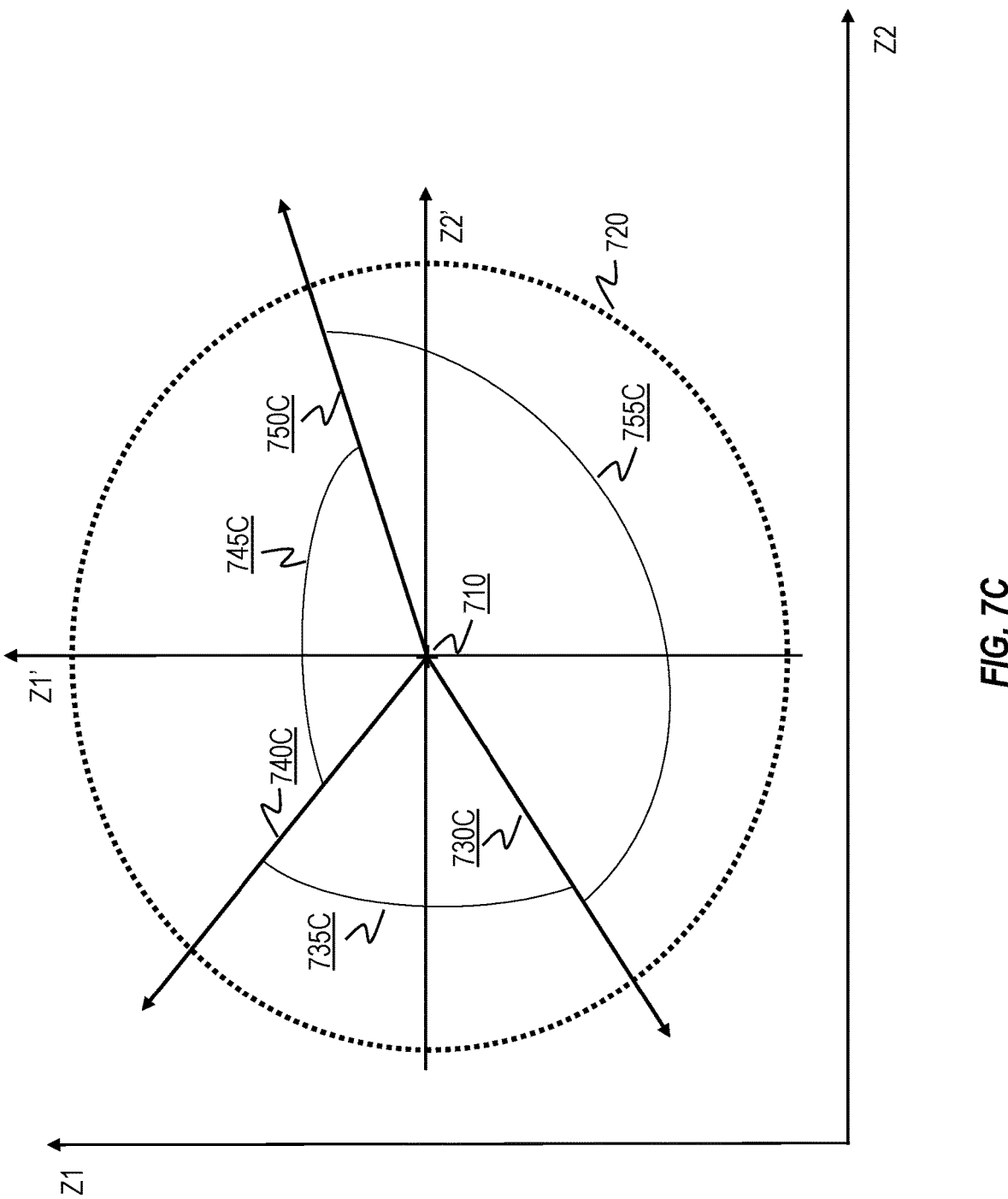

FIG. 7C further illustrates an RoR 730C, an RoR 740C, and an RoR 750C and angles 735C, 745C, and 755C between the RoRs. As shown in this scenario, the RoR 730C, the RoR 740C, and the RoR 750C are outside of the cluster boundary 710. If the difference between the angles 735C, 745C, and 755C between the RoRs is larger than the scattering threshold 415, it can be determined that the RoRs are scattering from each other.

Figure 7D:
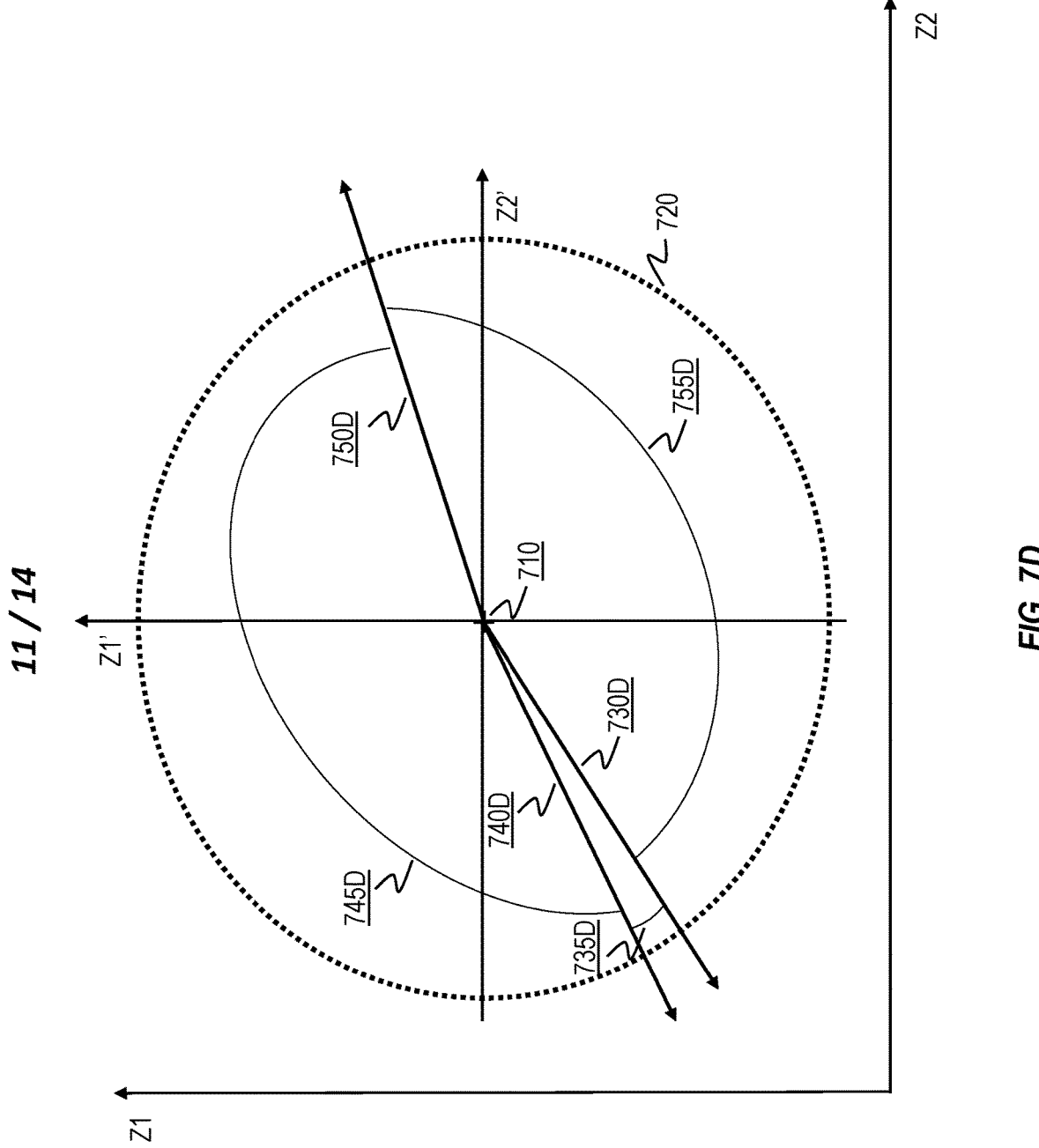

FIG. 7D further illustrates an RoR 730D, an RoR 740D, and an RoR 750D and angles 735D, 745D, and 755D between the RoRs. As shown in this scenario, the RoR 730D, the RoR 740D, and the RoR 750D are outside of the cluster boundary 710. However, the RoR 730D and RoR 740D are pointing towards a similar deviation direction, which is distinct from the deviation direction that the RoR 750D is pointing. If the difference between the angles 735D and 745D, and 755D is larger than the scattering threshold 415, it can be determined that the RoRs 730D and 740D are scattering from the RoR 750D.

Figure 7E:
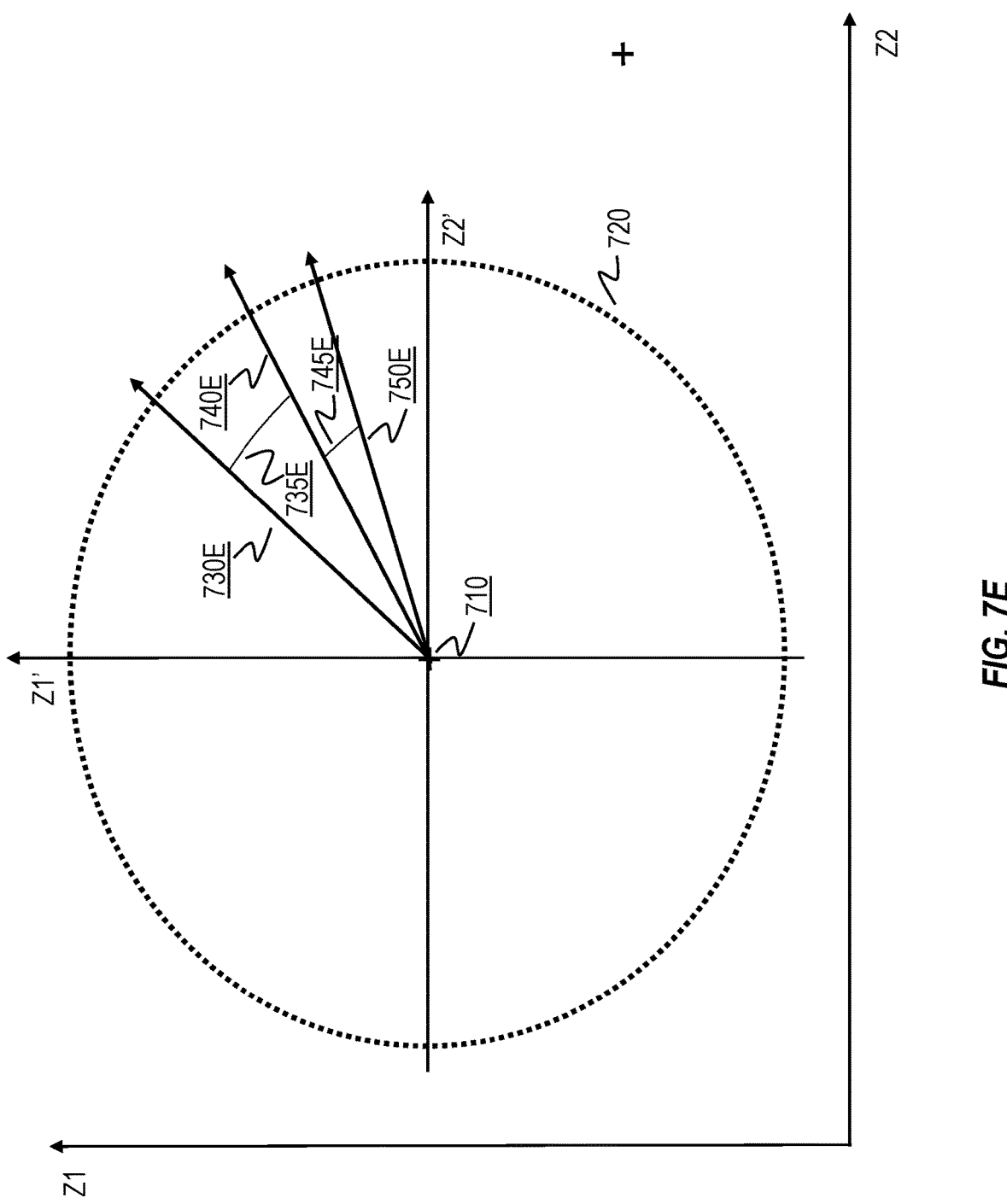

FIG. 7E further illustrates an RoR 730E, an RoR 740E, and an RoR 750E and angles 735E and 745E between the RoRs. As shown in this scenario, the RoR 730E, the RoR 740E, and the RoR 750E are outside of the cluster boundary 710, but are all pointing in the deviation direction.

As previously discussed, the scenario determination engine 420 is configured to determine which of the behavioral scenarios 418 is occurring and to give context to the scenarios. In one embodiment, the scenario determination engine 420 includes the domain-dependent rules engine 422 and/or the classification engine 426. The domain-dependent rules engine 422 includes one or more rules 424 that define a context for each of the behavioral scenarios 418. For example, a particular rule 424 may specify that if the angle between two RoRs is lower than ALPHA, and the magnitude of each vector is larger than THETA, then this is considered a behavioral deviation of type A. It will be noted that there can be any number of rules 424 and thus the embodiments and claims disclosed herein are not limited by any particular number or type of rules.

A rule 424 can be used to determine if the scenarios of FIGS. 7A-7E is occurring. For example, the following rules and the context they provide may apply to the scenarios of FIGS. 7A-7E:

1. For FIG. 7A: All AMRs within a cluster are operating normally—no deviation with respect to normal operation.
2. For FIG. 7B: A single too-close set of AMRs is deviating from its previous behavior. This is typically related to some anomaly/failure occurring simultaneously in these AMRs since other AMRs are performing as expected.
3. For FIG. 7C: Multiple (or all) AMRs are deviating in different directions. Erratic behavior is typically caused by failures in a larger system or infrastructure, which affects differently all AMRs, such as defects in their navigation system.
4. For FIG. 7D: Multiple AMRs or multiple sets of too-close AMRs are deviating in a similar direction, with one (or a single too-set close) deviating in an opposite direction. Typically, it reflects that most AMRs are following a new functional pattern, except for a smaller group of AMRs that are still following a legacy functional pattern. The smaller group may be delayed in adopting new functionalities.
5. For FIG. 7E: All AMRs are deviating in an organized way—all AMRs are performing differently than expected but converging to the same similar functional pattern, typically due to the same underlying causes (e.g., a new task or same communication failure).

The classification engine 426 can also be used to determine which behavioral scenario 418 is occurring. In one embodiment, the classification engine 426 may implement a decision tree 428 or other classification model. In the implementation, observations are collected, and a label is defined for each behavioral scenario. Features for training are also defined. For example, information related to the RoRs such as the magnitudes of the resultant vectors and the angles between them can be defined as features. The system then defines the label (i.e., the behavioral scenario) that corresponds each feature. The number of observations that have to be collected is unknown and will depend on the complexity of the behavioral scenarios and the number of defined features.

Returning to FIG. 4, it is illustrated that in some embodiments the behavior scenario analyzer 270 includes an alarm module 430. In operation, the alarm module 430 triggers an alarm whenever the scenario determination engine 420 determines that the behavioral scenario 418 that is occurring shows a deviation from the normal or expected behavior. In addition, the alarm module may also provide context for the alarm to help a human user or some user agent of the system 200 to determine the cause of the deviation from expected behavior more efficiently. For example, if the determined behavioral scenario 418 of FIG. 7B is detected, the alarm module will trigger an alarm because a set of closely aligned AMRs have moved beyond the boundary of expected behavior while the remaining AMRs are performing as expected. The alarm module 430 may also provide context for this alarm, which is this case may be that some hardware or software failure is happening simultaneously in the set of AMRs that have moved beyond the boundary of expected behavior.

Based on this context, the human user or user agent of the system can focus the investigation of the causes on the deviation on the set of AMRs and the types of issues that may cause the alarm. This advantageously may save time and may also save on computing system resources as the analysis of the behavior deviation need not focus on causes that are likely unrelated to the current behavior deviation. In addition, any corrective actions may also be focused on those likely to correct the behavior deviation, again saving on time and computing system resources.

Example Methods

Figure 8:
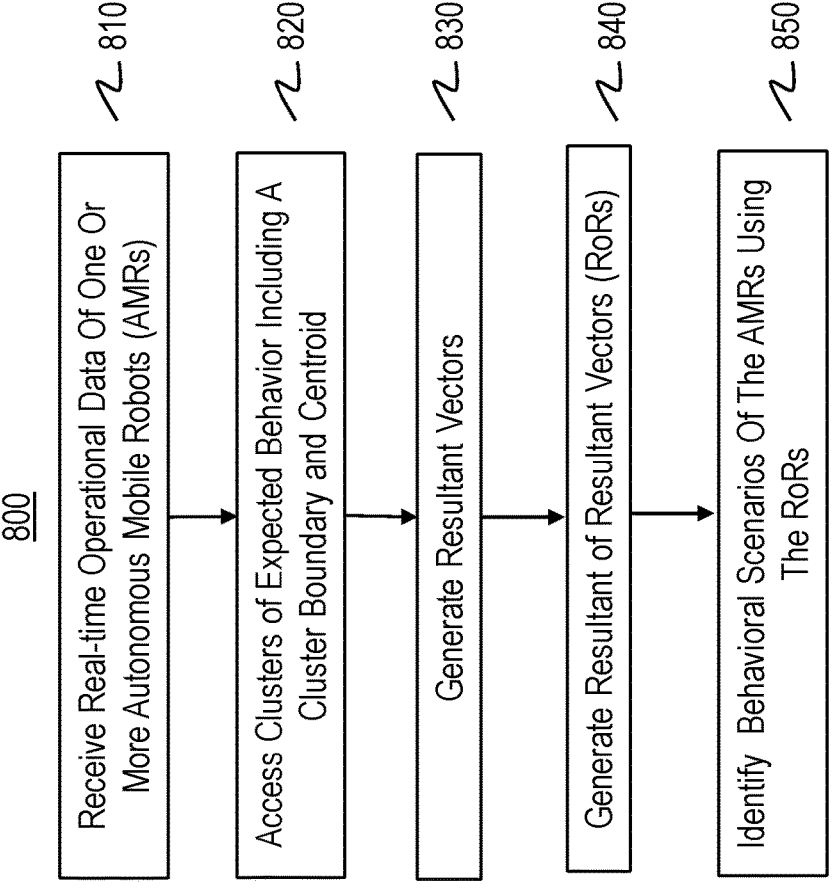
FIG. 8 illustrates a flowchart of an example method for one or more machine-learning models to determine behavioral scenarios for AMRs.

It is noted with respect to the disclosed methods, including the example method of FIG. 8, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 for one or more machine-learning models to determine behavioral scenarios for AMRs in disclosed. The method 800 will be described in relation to one or more of the figures previously described, although the method 800 is not limited to any particular embodiment.

The method 800 includes receiving real-time operational data related to the operation of the one or more Autonomous Mobile Robots (AMRs) belonging to an AMR group, the real-time operational data defining a most recent operational point for each AMR in the AMR group (810). For example, as previously described real time operational data, which may include, but is not limited to, the real-time sensor data 450 and the behavior data 460, are received by the behavior scenario analyzer 270. The real-time operational data includes a most recent operational point such as the most recent operational points 536, 546, 556, 566, 576, and 586 for each AMR in the AMR groups 210-240.

The method 800 includes accessing one or more clusters of expected behavior, for the one or more AMRs, that were generated by one or more machine-learning models using historical operational data related to the operation of the one or more AMRs, each cluster defining a possible behavioral scenario for each AMR of the one or more AMRs, each cluster including a cluster boundary that defines a limit of the expected behavior and a cluster centroid that defines an average of expected behavior of each AMR of the one or more AMRs in the possible behavioral scenario (820). For example, as previously discussed, the cluster 310 including the cluster boundary 312 and cluster centroid 314, the cluster 320 including the cluster boundary 322 and cluster centroid 324, and the cluster 330 including the cluster boundary 332 and cluster centroid 334 are accessed. The clusters and their respective cluster boundaries and centroids are generated using the historical operational data including the sensor data 250 and the behavior data 260. The cluster boundaries define a limit on the expected behavior and the cluster centroids define an average expected behavior.

The method 800 includes generating by the one or more machine-learning models resultant vectors that extend from the cluster centroid to the most recent operational point of each AMR (830). For example, as previously described the resultant vectors 412 are generated by the resultant vector engine 410.

The method 800 includes generating one or more Resultant of Resultant Vectors (RoRs) from one or more resultant vectors (840). For example, as previously described the RoRs 416 are generated by the resultant vector engine 410 from one or more of the resultant vectors 412. In one embodiment, the RoRs are generated by grouping two or more resultant vectors 412 that are determined to be close to each other using the predetermined phase threshold 414.

The method 800 includes identifying one or more behavioral scenarios of the one or more AMRs using the one or more RoRs (850). As previously described, the scenario determination engine 420 may use domain-specific rules or a classification technique to identify behavioral scenarios 418.

Further Example Embodiments

Following are some further example embodiments of the invention. These are presented only by way of example and are not intended to limit the scope of the invention in any way.

Embodiment 1: A method, comprising: receiving real-time operational data related to the operation of the one or more Autonomous Mobile Robots (AMRs) belonging to an AMR group, the real-time operational data defining a most recent operational point for each AMR in the AMR group; accessing one or more clusters of expected behavior, for the one or more AMRs, that were generated by one or more machine-learning models using historical operational data related to the operation of the one or more AMRs, each cluster defining a possible behavioral scenario for each AMR of the one or more AMRs, each cluster including a cluster boundary that defines a limit of the expected behavior and a cluster centroid that defines an average of expected behavior of each AMR of the one or more AMRs in the possible behavioral scenario; generating by the one or more machine-learning models resultant vectors that extend from the cluster centroid to the most recent operational point of each AMR; generating one or more Resultant of Resultant Vectors (RoRs) by grouping two or more resultant vectors that are determined to be close to each other using a predetermined phase threshold value; and using the one or more RoRs to identify one or more behavioral scenarios of the one or more AMRs.

Embodiment 2: The method of embodiment 1, further comprising: applying by the one or more machine-learning models a dimensionality transform to the real-time operational data.

Embodiment 3: The method of embodiment 2, wherein the dimensionality transform is one of Principled Component Analysis (PCA) or Factor Analysis of Mixed Data (FAMD).

Embodiment 4: The method of embodiments 1-3, wherein the real-time operational data comprises sensor data and behavior data related to the one or more AMRs of the AMR group.

Embodiment 5: The method of embodiment 4, wherein the sensor data and the behavior data is concatenated to form concatenated data that is used in generating the one or more resultant vectors.

Embodiment 6: The method of embodiments 1-5, wherein identifying one or more behavioral scenarios using the one or more RoRs comprises: applying one or more domain specific rules that provide context to each of the identified behavioral scenarios to the one or more behavioral scenarios.

Embodiment 7: The method of embodiments wherein identifying one or more behavioral scenarios using the one or more RoRs comprises: applying one or more classification models to the one or more behavioral scenarios.

Embodiment 8: The method of embodiments 1-7, wherein it is indicative of a deviation from the expected behavior for at least one of the one or more AMRs when one or more of the RoRs extend beyond the cluster boundary, and wherein it is indicative that there is no deviation from the expected behavior for any of the one or more AMRs when none of the RoRs extend beyond the cluster boundary.

Embodiment 9: The method of embodiments 1-8, wherein generating the one or more RoRs comprises grouping two or more resultant vectors that are determined to be close to each other using a predetermined phase threshold value.

Embodiment 10: The method of embodiments 1-9, wherein an alarm is generated when one or more of the RoRs extend beyond the cluster boundary.

Embodiment 11: A system, comprising hardware and/or software, operable to perform any of the operations, methods, or processes, or any portion of any of these, disclosed herein.

Embodiment 12: A non-transitory storage medium having stored therein instructions that are executable by one or more hardware processors to perform operations comprising the operations of any one or more of embodiments 1-10.

Example Computing Devices and Associated Media

Finally, because the principles described herein may be performed in the context of a computing system some introductory discussion of a computing system will be described with respect to FIG. 9. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
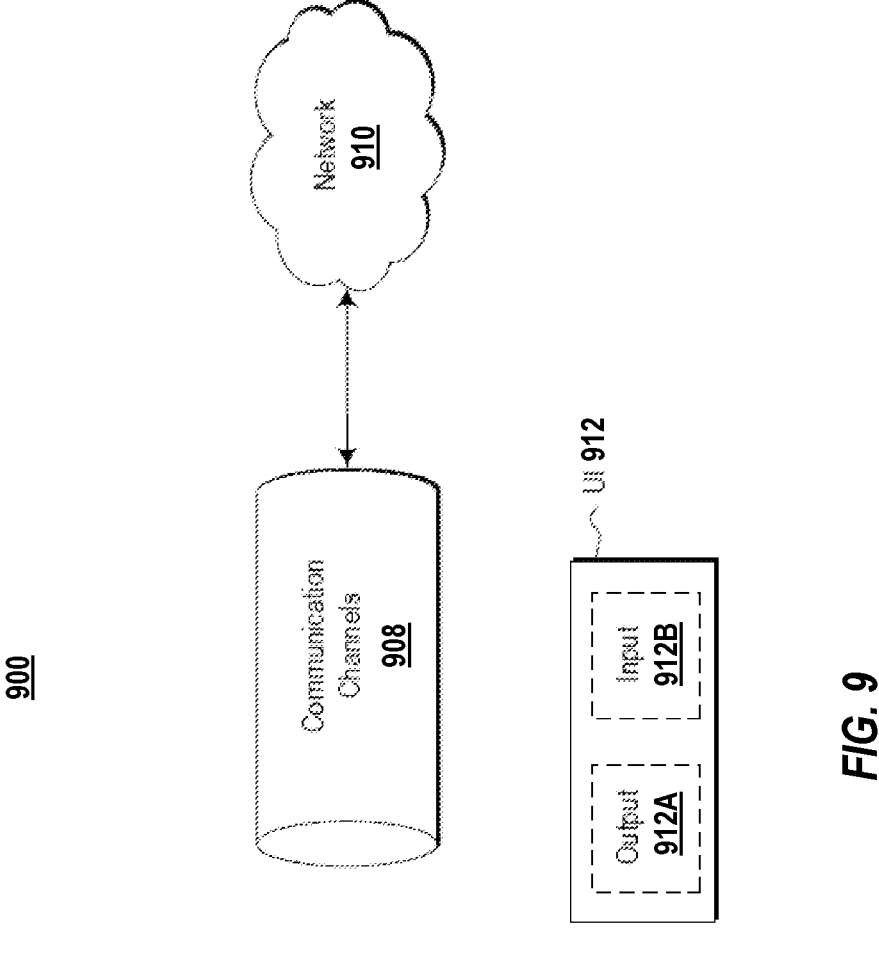
FIG. 9 illustrates an example computing system in which the embodiment described herein may be employed.
Figure 9:
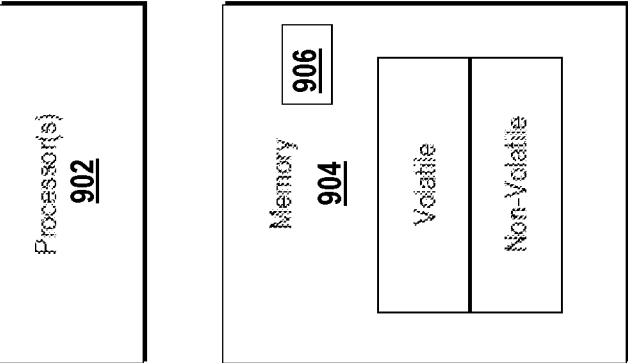

As illustrated in FIG. 9, in its most basic configuration, a computing system 900 typically includes at least one hardware processing unit 902 and memory 904. The processing unit 902 may include a general-purpose processor and may also include a field-programmable gate array (FPGA), an application-specific integrated circuit (ASIC), or any other specialized circuit. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 also has thereon multiple structures often referred to as an "executable component". For instance, memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, and so forth. Examples of input mechanisms 912B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 900 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 902 and memory 904, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving real-time operational data related to an operation of one or more Autonomous Mobile Robots (AMRs) belonging to an AMR group, the real-time operational data defining a most recent operational point for each of the one or more AMRs in the AMR group;

generating one or more clusters of expected behavior, for the one or more AMRs, that were generated by one or more machine-learning models using historical operational data related to the operation of the one or more AMRs, each cluster defining a possible behavioral scenario for each AMR of the one or more AMRs, each cluster including a cluster boundary that defines a limit of the expected behavior of each AMR of the one or more AMRs and a cluster centroid that defines an average of the expected behavior of each AMR of the one or more AMRs in the possible behavioral scenario;

generating by the one or more machine-learning models one or more resultant vectors that extend from the cluster centroid to the most recent operational point of each AMR;

generating one or more Resultant of Resultant Vectors (RoRs) from the one or more resultant vectors;

identifying one or more behavioral scenarios of the one or more AMRs using the one or more RoRs; and generating an alarm when it is determined that at least one of the one or more behavioral scenarios shows a deviation from the expected behavior to thereby warn a user of the deviation from the expected behavior, wherein the real-time operational data comprises sensor data and behavior data related to the one or more AMRs of the AMR group, and wherein the sensor data and the behavior data is concatenated to form concatenated data that is used in generating the one or more resultant vectors.

2. The method of claim 1, further comprising:

applying by the one or more machine-learning models a dimensionality transform to the real-time operational data.

3. The method of claim 2, wherein the dimensionality transform is one of Principled Component Analysis (PCA) or Factor Analysis of Mixed Data (FAMD).

4. The method of claim 1, wherein identifying one or more behavioral scenarios using the one or more RoRs comprises:

applying one or more domain specific rules that provide context to each of the identified behavioral scenarios to the one or more behavioral scenarios.

5. The method of claim 1, wherein identifying one or more behavioral scenarios using the one or more RoRs comprises:

applying one or more classification models to the one or more behavioral scenarios.

6. The method of claim 1, wherein it is indicative of a deviation from the expected behavior for at least one of the one or more AMRs when one or more of the RoRs extend beyond the cluster boundary, and wherein it is indicative that there is no deviation from the expected behavior for any of the one or more AMRs when none of the RoRs extend beyond the cluster boundary.

7. The method of claim 1, wherein generating the one or more RoRs comprises grouping two or more resultant vectors that are determined to be close to each other using a predetermined phase threshold value.

8. A non-transitory storage medium having stored therein instructions that are executable by one or more hardware processors to perform operations comprising:

receiving real-time operational data related to an operation of one or more Autonomous Mobile Robots (AMRs) belonging to an AMR group, the real-time operational data defining a most recent operational point for each of the one or more AMRs in the AMR group;

generating one or more clusters of expected behavior, for the one or more AMRs, that were generated by one or more machine-learning models using historical operational data related to the operation of the one or more AMRs, each cluster defining a possible behavioral scenario for each AMR of the one or more AMRs, each cluster including a cluster boundary that defines a limit of the expected behavior of each AMR of the one or more AMRs and a cluster centroid that defines an average of the expected behavior of each AMR of the one or more AMRs in the possible behavioral scenario;

generating by the one or more machine-learning models one or more resultant vectors that extend from the cluster centroid to the most recent operational point of each AMR;

generating one or more Resultant of Resultant Vectors (RoRs) from one or more resultant vectors;

identifying one or more behavioral scenarios of the one or more AMRs using the one or more RoRs; and generating an alarm when it is determined that at least one of the one or more behavioral scenarios shows a deviation from the expected behavior to thereby warn a user of the deviation from the expected behavior, wherein the real-time operational data comprises sensor data and behavior data related to the one or more AMRs of the AMR group, and wherein the sensor data and the behavior data is concatenated to form concatenated data that is used in generating the one or more resultant vectors.

9. The non-transitory storage medium of claim 8, further comprising the following operation:

applying by the one or more machine-learning models a dimensionality transform to the real-time operational data.

10. The non-transitory storage medium of claim 9, wherein the dimensionality transform is one of Principled Component Analysis (PCA) or Factor Analysis of Mixed Data (FAMD).

11. The non-transitory storage medium of claim 8, wherein identifying one or more behavioral scenarios using the one or more RoRs comprises:

applying one or more domain specific rules that provide context to each of the identified behavioral scenarios to the one or more behavioral scenarios.

12. The non-transitory storage medium of claim 8, wherein identifying one or more behavioral scenarios using the one or more RoRs comprises:

applying one or more classification models to the one or more behavioral scenarios.

13. The non-transitory storage medium of claim 8, wherein it is indicative of a deviation from the expected behavior for at least one of the one or more AMRs when one or more of the RoRs extend beyond the cluster boundary, and wherein it is indicative that there is no deviation from the expected behavior for any of the one or more AMRs when none of the RoRs extend beyond the cluster boundary.

14. The non-transitory storage medium of claim 8, wherein generating the one or more RoRs comprises grouping two or more resultant vectors that are determined to be close to each other using a predetermined phase threshold value.

* * * * *